June 5, 1923.
D. G. STANBROUGH
MOTOR VEHICLE
Filed Dec. 17, 1919
1,457,947
2 Sheets-Sheet 1
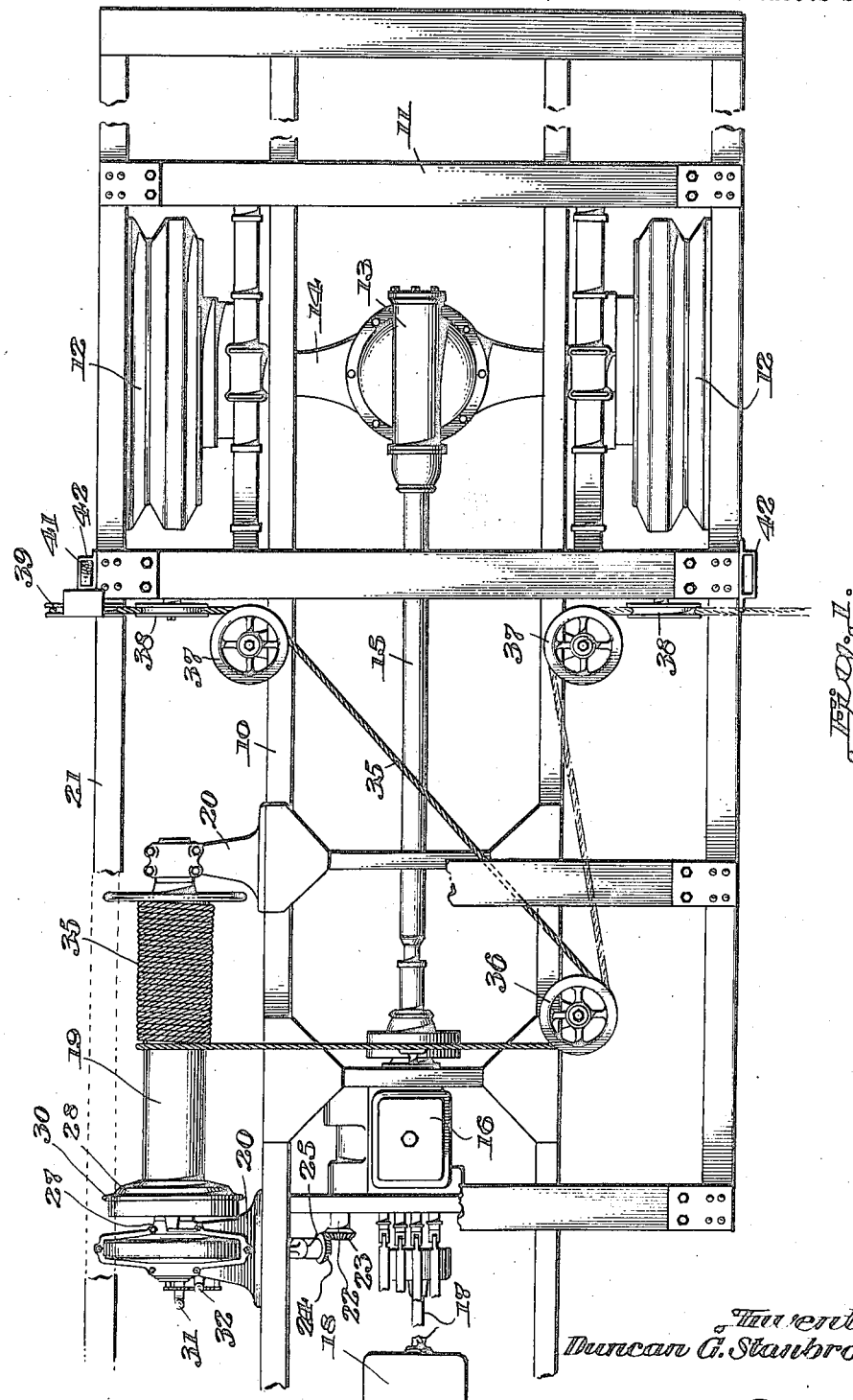
Inventor,
Duncan G. Stanbrough,
By Millar Tibbitts
Attys.

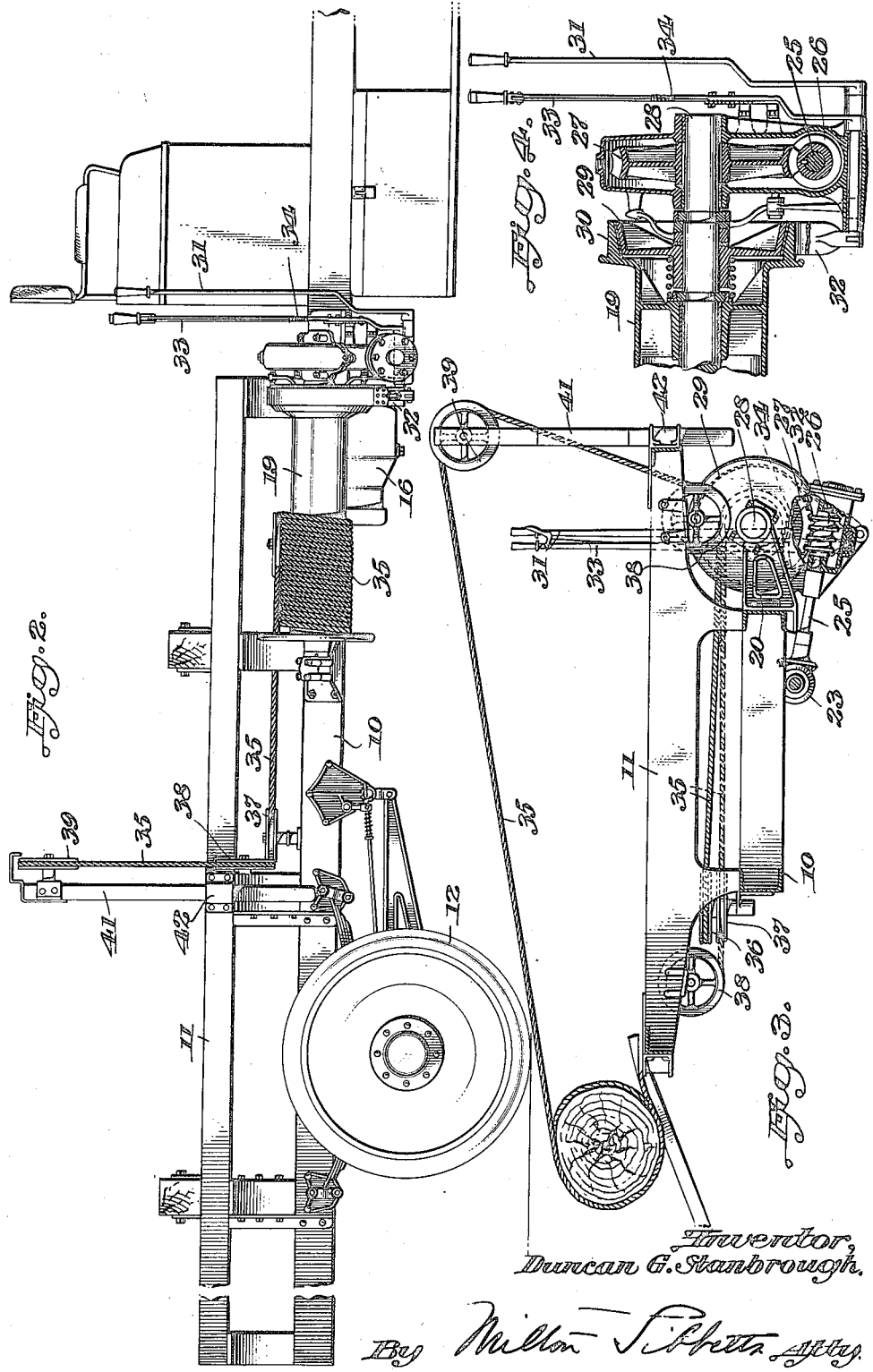

Patented June 5, 1923.

1,457,947

UNITED STATES PATENT OFFICE.

DUNCAN G. STANBROUGH, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed December 17, 1919. Serial No. 345,521.

*To all whom it may concern:*

Be it known that I, DUNCAN G. STANBROUGH, a citizen of the United States, and resident of Detroit, Wayne County, State of Michigan, have invented certain new and useful Improvements in Motor Vehicles, of which the following is a specification.

This invention relates to motor vehicles and more particularly to loading and unloading devices therefor.

The invention has among its objects to facilitate the loading of material such as logs on motor trucks and also to facilitate the unloading of the material, thereby decreasing the cost of loading, transporting and unloading such material.

Another object is to enable the operator to load the logs from either side of the motor vehicle or truck.

Another object is to provide a construction in which the various parts will be so located as to be protected from injury or damage during the loading operation or during the transporting of the load.

Another object is to provide a construction by means of which the loading and unloading mechanism can be controlled from the operator's seat on the motor truck.

Still further objects will appear as the description proceeds.

The invention by means of which the above objects are carried out comprises briefly a motor truck frame having a motor mounted thereon, a transmission shaft for transmitting power to drive the truck and a drum operatively connected to said transmission shaft and located beneath and inside of the outer edge of the platform frame of the truck, this latter frame being carried by the main frame. Suitable clutch mechanism is interposed between the drum and the power transmission shaft by means of which the drum may be connected to and disconnected from said shaft at the will of the operator, and braking mechanism is also provided for the drum in order to facilitate the unloading of the material from the truck when the driving connections for the drum have been thrown out of operation. The drum is provided with a cable and suitable guides are provided for guiding the cable to either side of the truck frame in order that logs may be loaded on to the truck from either side thereof.

One embodiment of the invention has been illustrated in the accompanying drawings and in these drawings:

Fig. 1 is a top plan view showing the rear portion of the motor truck provided with my improved loading mechanism;

Fig. 2 is a side elevation of the construction shown in Fig. 1;

Fig. 3 is a transverse sectional view illustrating the drum mounting and guiding means for the cable, and Fig. 4 is a detail view illustrating the friction driving connections and braking mechanism for the drum.

The motor truck upon which my improved loading mechanism is mounted may be of any desired construction and, as illustrated in the drawings, comprises a main frame 10, and a platform frame 11 mounted thereon. Suitable driving wheels or traction wheels 12 are connected to the rear end of the truck in the usual manner, these wheels being driven through the usual differential driving mechanism 13 which is mounted on the rear axle 14 and is driven by the power transmission shaft 15. The shaft 15 is driven through the usual transmission mechanism enclosed in the transmission case 16 from the main power shaft 17, which, in turn, is driven by the motor 18, this motor being preferably of the internal combustion type.

The loading mechanism comprises a drum 19, which is mounted in suitable brackets 20 carried by the main frame 10 of the truck and it should be noted that the drum is positioned below and beneath the side edge 21 of the platform frame 11, this location of the drum preventing it from damage or injury by the material being loaded on the truck.

Suitable driving connections between the drum 19 and the power transmission mechanism are provided and these connections will next be described.

A power take off shaft or jack shaft 22 is connected in any suitable manner to the power transmission mechanism carried by the transmission case 16 and this shaft is connected through bevel gears 23 and 24 to a shaft 25. The shaft 25 is provided at its opposite end with a worm 26 which meshes with a worm wheel 27 carried by a shaft 28 mounted in the brackets 20 above described. The clutch mechanism between the shaft 28 and the drum 19 is illustrated in detail in Fig. 4 and comprises a clutch member 29 which is secured to the shaft 28 and a clutch member 30 carried by the drum 19 and these members may be thrown into and out of operative engagement with each other by means of a clutch shifting lever 31.

Suitable braking mechanism is provided for the drum 19, this mechanism comprising a brake band 32 which partially encircles a portion of the drum 19 and is controlled by means of a lever 33, suitable locking mechanism 34 being provided for setting the brake in any desired position of adjustment.

A cable 35 is secured at one end to the drum 19 and is adapted to be coiled thereon as the drum is rotated and suitable means such as grooved pulleys or sheaves 36, 37 and 38 are provided for guiding the cable 35 to either side of the truck frame, it being noted that a separate set of sheaves, 37 and 38, is provided at each side of the truck. From the sheave 38 the cable is directed upwardly and over the sheave 39 which is supported on a spindle 40 carried by an upright standard 41, the standard 41 being removably carried by a socket member 42. It should be noted that a separate socket 42 is provided at each side of the truck so that the standard 41 may be shifted from one side to the other as desired. From the sheave 39 the cable is passed around the log to be loaded and the free end is secured to the side of the truck frame opposite that upon which the standard is mounted.

A brief description of the operation of the construction above described will now be given:

The motor truck is first driven to a position adjacent the logs to be loaded thereon and upon reaching this position the standard 41 is mounted upon the side farthest from the material to be loaded. The cable is then passed around the sheaves 36, 37 and 38 and over the sheave 39; from the sheave 39 it is carried to the opposite side of the truck and is passed around the log to be loaded, the free end being secured to the side of the truck frame adjacent the log to be loaded. The motor of the truck is then started, if it is not already in operation, and the clutch lever 31 is shifted in a manner to throw the drum 19 into operative connection with the worm wheel 27 and the shaft 28. The drum 19 will then be rotated winding up the cable 35 and gradually lifting the log to a position on the truck. In the practical operation of the device, suitable skids would probably be placed upon one side of the truck and adjacent the logs to be loaded and the logs would then be gradually lifted on the skids to a position on the truck.

When the above described mechanism is to be used for unloading the material from the truck, the logs will be loosened in any suitable manner from their position on the truck and then be gradually lowered on the skids by means of the cable, the brake mechanism controlling the unwinding of the cable from the drum 19 and thereby controlling the lowering of the logs.

From the above description, it will be seen that simple and efficient loading and unloading mechanism has been provided and that the mechanism has been so located as to be protected from injury or damage, the controlling means for the said mechanism being located in such a manner as to be readily accessible. It should also be noted that by means of my improved loading mechanism material may be loaded from either side of the truck and may also be unloaded at either side.

While I have in the above specification described one embodiment of my invention, it should be understood that the invention is capable of modification and that modifications and changes may be made in the construction and arrangement of the various cooperating parts without departing from the spirit or scope of the invention as expressed in the following claims.

What I claim and desire to secure by Letters Patent is:

1. A loading device comprising, in combination, a motor propelled vehicle having a main frame, a motor carried thereby and operatively connected to drive said vehicle, a platform frame mounted upon said main frame and overhanging the side thereof, a drum carried by said main frame and disposed beneath the overhanging part of said platform frame and operative driving connections between said drum and said motor.

2. A loading device comprising, in combination, a motor propelled vehicle having a main frame, a motor carried thereby and operatively connected to drive said vehicle, a platform frame mounted upon said main frame, a drum carried by said main frame and disposed beneath said platform frame, operative driving connections between said drum and said motor, including a clutch, a cable secured to said drum, guiding means for said cable, including a plurality of sets of sheaves disposed on opposite sides of said frame and an upright standard having cable guiding means thereon adapted to be detachably supported on either side of said frame.

In testimony whereof I affix my signature.

DUNCAN G. STANBROUGH.